United States Patent
Terawaki et al.

[11] Patent Number: 5,534,705
[45] Date of Patent: Jul. 9, 1996

[54] METHOD FOR CONTROLLING ROBOT ATTITUDE BASED ON TOOL WORKPIECE ANGLE

[75] Inventors: Fumikazu Terawaki; Yoshitaka Ikeda; Yuuki Makihata, all of Yamanashi, Japan

[73] Assignee: Fanuc Ltd., Japan

[21] Appl. No.: 330,025

[22] Filed: Oct. 27, 1994

[30] Foreign Application Priority Data

Oct. 29, 1993 [JP] Japan .................................. 5-293936

[51] Int. Cl.$^6$ .................................................. G01N 21/86
[52] U.S. Cl. ................... 250/559.29; 250/559.33; 219/121.82
[58] Field of Search ......................... 250/559.29, 559.33; 356/375, 376; 219/121.63, 121.78, 121.82, 124.02, 124.22

[56] References Cited

U.S. PATENT DOCUMENTS 5,001,324  3/1991  Aiello et al. ................. 219/121.63
5,399,870  3/1995  Torii et al. ................... 250/559.29

Primary Examiner—Que T. Le
Attorney, Agent, or Firm—Staas & Halsey

[57] ABSTRACT

A method of controlling a robot attached to a tool. The position of the robot is corrected in real time by detecting a target position on a workpiece by a laser sensor. A laser light emitted from a laser light source of the laser sensor scans a surface of the workpiece toward a direction across an operating line. An initial scanning forms a locus of laser irradiation points and crossing points which intersect the locus with the operating line on the workpiece. Angle $\alpha$ is defined to be an angle formed between an axis of the tool and the locus on the surface of the workpiece. Angle $\beta$ is defined to be an angle formed between the operating line (point series line connecting the crossing points obtained by a current and past scanning) and the center axis of the tool. Further, angle $\gamma$ is defined to be a rotation angle around an axis of the tool on the basis of the operating line. An attitude of the robot is determined by the angles $\alpha$, $\beta$ and $\gamma$. The attitude of the robot is controlled by equalizing the angles $\alpha$, $\beta$ and $\gamma$ to set values $\alpha_{set}$, $\beta_{set}$ and $\gamma_{set}$, respectively, at instruction positions.

7 Claims, 5 Drawing Sheets

METHOD FOR CONTROLLING ROBOT ATTITUDE BASED ON TOOL WORKPIECE ANGLE

BACKGROUND OF THE INVENTION

1. Field of the Invention

This invention relates to a method for correcting a position of a robot on the real time basis while detecting a target position on a workpiece by a laser sensor, and more particularly, to a method for controlling a robot such that the attitude of the robot may be always kept constant with respect to the object to be worked, by calculating the tool angle with respect to a sectional shape of the object to be worked or a direction of a row of points generated by laser scanning which is used primarily for detecting the target position detected for every laser scanning period.

2. Description of the Related Art

It is well known that a real time tracking method utilizing a laser sensor is adopted to practice a specific operation by making a robot move along an operation line such as a welding line. In such a conventional tracking method, a robot is controlled by detecting a relative position of a characteristic part of a workpiece or a distance to the characteristic part by using a laser sensor, and by correcting an instruction path of the robot which determines the movement of the robot.

A robot controlling method has not yet been realized which can control an attitude of a robot in association with a specified surface of a workpiece or a direction of an operating line. Namely, in the conventional methods, the attitude of a robot whose position is being corrected by a laser sensor is determined by a method for dividing and distributing attitudes at the adjacent two instruction points or by a method for maintaining the attitude of the robot constant irrespective of any changes in the workpiece side affected by the movement of the robot.

According to these conventional methods, it is possible to correct the position of robot by using a laser sensor but impossible to control the attitude of a robot by detecting the change in the workpiece side by a laser sensor. Therefore, when the change of a relative shape of the workpiece is large, it is necessary to determine a lot of instruction points and to instruct the attitudes of a robot all at every instruction point. This is a serious factor to decrease the efficiency of operation.

SUMMARY OF THE INVENTION

An object of the present invention is to provide a method of a robot controlling where the robot position is corrected on the real time basis by detecting a target position on the workpiece using a laser sensor, wherein the robot is controlled such that the attitude of the tool may be kept constant with respect to the specific surface of the workpiece and/or the operation line, using detected data obtained by periodic scanning operation of the laser sensor.

This method of robot controlling includes at least one of the following modes for the attitude of the tool:

(1) An angle held between an axial line of a tool and a workpiece in a plane perpendicular to the robot travelling direction (hereinafter referred to as a "working angle") is kept constant.

(2) An angle held between an axial line of a tool and an operation line (hereinafter referred to as a "push angle") is kept constant, the operation line being defined to be a series of intersections between a line of instruction paths and an irradiation point series.

(3) A rotation angle around the center axis of a tool with respect to the operation line (hereinafter referred to as "tool-around angle") is kept constant.

This invention can be practically utilized in many technical fields. Here, effective and concrete applications of this invention are as follows.

(1) Automating of a welding operation in which the relative attitude of a tool to the workpiece may give a great influence on the quality of operation.

(2) Automating of a chamfering operation in which the attitude of a tool with respect to a specific surface of workpiece must be always kept constant.

(3) Automating of a painting operation in which a tool angle to a specific curved surface of the workpiece must be maintained constant.

(4) Automating of a grinding operation in which a finishing accuracy is obtained by maintaining a tool angle with respect to a specific curved surface of the workpiece must be kept constant.

DETAILED DESCRIPTION OF THE PREFERRED EMBODIMENTS

In the embodiments of this invention, a tool attitude to a workpiece is defined by three factors such as (a) a workpiece angle, (b) a push angle, and (c) a tool-around angle. The above-mentioned angles will be explained with reference to FIGS. 1A and 1B and FIGS. 2A and 2B.

Figure 1A:
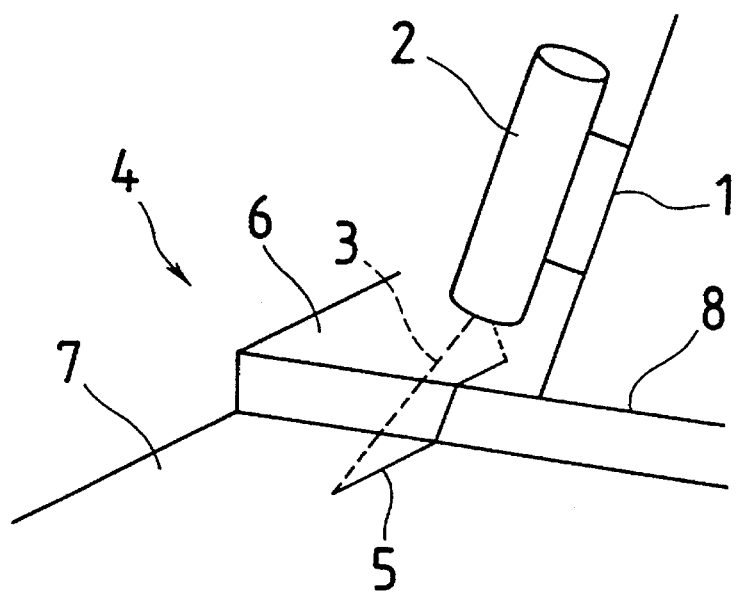
FIGS. 1A and 1B are schematic diagrams for illustrating how to determine a workpiece angle α by taking a welding operation of a stage portion as an example.

First of all, the workpiece angle is explained in detail with reference to FIGS. 1A and 1B. In FIG. 1A, reference numeral 1 denotes a tool which is a welding torch in this case. Numeral 2 denotes a laser light source of a laser sensor supported and fixed to the tool 1 by a robot (not shown). A deflected laser beam 3 emitted from the laser light source 2 scans a step part of a workpiece 4. Reference numeral 5 denotes a locus of irradiation points. All irradiation points are observed as a light point row by a CCD array (not shown). The laser sensor is connected to an image processor so that position data of each light point on the sensor coordinate system are obtained. A three-dimensional position of each light point on the workpiece coordinate is calculated from the data obtained from the sensor and the data regarding the position and the attitude of the robot to be detected when they are being sensed. The functions of such a laser sensor system have already been known, and therefore any more detailed explanation will be omitted.

Figure 1B:
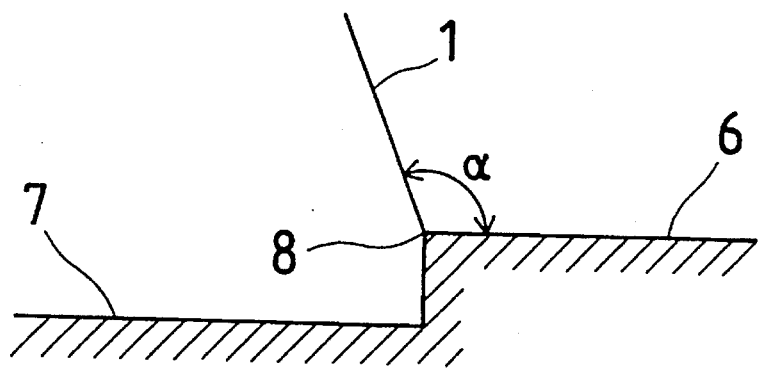

The step portion of the workpiece 4 is also shown in FIG. 1B which is a sectional view of the workpiece taken along the locus 5 of the irradiation points shown in FIG. 1A. As shown by FIG. 1B, the step part is defined by two surfaces 6 and 7. In this example, the step part is welded by the tool (welding torch) along a ridge line 8 which is an edge line of the surface 6.

In the above-described arrangement, an angle of the tool 1 with respect to the sectional surface which is detected by the laser sensor at every one scan of the laser sensor is defined as a work angle $\alpha$, the sectional surfaces being a section of a workpiece which is imagined to be cut with laser beam from the laser source 2, as shown in FIG. 1B. However, regarding a selection of a sectional surface to be selected as a reference part in measuring the work angle $\alpha$, the operator should select the part he thinks most suitable, taking into consideration contents of the work or an easiness of the detection by the laser sensor. In the example of FIG. 1B, an angle $\alpha$ of inclination of the axis of the tool 1 is detected on the basis of the locus of the irradiation points (direct line) 5 on the upper surface 6.

Next, a push angle and a tool-around angle will be explained by referring to FIGS. 2A and 2B in which the same elements as those in FIGS. 1A and 1B are allotted the common reference numerals. The welding lines, i.e., the operating lines 8 are straight lines in the case of FIGS. 1A and 1B. On the other hand, they are curved lines 8 in FIGS. 2A and 2B.

Here, an angle formed between a tangential line of an operating line and the center axis of the tool 1 is defined as a push angle $\beta$. The operating line is a point row line connecting the crossing points 9 between the locus of the scanning laser beam 5 and the ridge line 8 of the surface 6. Further, the tangent line of this operating line is approximately obtained from the current point 9 and the past plural points 9.

Further, the tool-round angle $\gamma$ is defined as a rotational angle of the tool 1 around the tool axis with respect to the operation line. For example, as shown in FIG. 2B, an axial line 3a of the laser sensor is arranged to be in parallel with the axial line of the tool, and a flat plane (A) including both axial lines (i.e., a hatched plane shown in FIG. 2B) is assumed. Then, the tool-around angle $\gamma$ is defined as a rotational angle of the plane A with respect to the tangential line t. FIG. 3 schematically shows the relation between a sensing period of the laser sensor (ordinarily equivalent to a deflection scanning period of the laser beam) and positions of interpolation points as successive target points for guiding the robot, the sensing period being equal to the calculating period of work angle $\alpha$, push angle $\beta$ and tool-around angle $\gamma$. In FIG. 3, the laser beam scanning positions of each period are expressed as $S_{j-3}$, $S_{j-2}$, $S_{j-1}$, $S_j$, $S_{j+1}$. . . . The interpolation points are expressed as $P_{j-k-1}$, $P_{j-k}$, . . . , $P_j$, $P_{j+1}$ . . . which are determined by correcting the instruction path by the laser sensor, and form a point row of the target positions for the movement of the robot.

In the present invention, set values of the work angle, the push angle and the tool-around angle are predetermined as $\alpha_{set}$, $\beta_{set}$ and $\gamma_{set}$, respectively. The attitude of the robot is calculated at each interpolation point, in order that at least any one of deviations $\Delta\alpha$, $\Delta\beta$ and $\Delta\gamma$ from these set values approaches to zero.

The sensor data to be used for the calculation are the data obtained at the latest possible sensing period in the range where data processing is possible (that is, data representing the sectional shape and the latest detected point) and the data obtained at a past sensing period which was given before several sensing periods from the latest sensing period (that is, data representing N retroactive detected points).

For example, in order to keep each of value of $\alpha$, $\beta$ and $\gamma$ at predetermined values, respectively, by setting N=3 deviation $\Delta\alpha$, $\Delta\beta$ and $\Delta\gamma$ are calculated based on sensor data $Q_j$, $Q_{j-1}$, and $Q_{j-2}$ which are obtained at a scanning period at $S_j$ and at two immediately preceding scanning periods $S_{j-1}$ and $S_{j-2}$. Then, a robot attitude which causes the work angle, the push angle and the tool-around angle at interpolation points $P_j$, $P_{j+1}$ and $P_{j+2}$ between $S_j$ and $S_{j+1}$ to be in accord with $\alpha_{set}$, $\beta_{set}$ and $\gamma_{set}$ are calculated.

It is feasible to enhance the accuracy of the robot operation by holding the work angle, the push angle and the tool-around angle at proper values on the basis of the aforementioned principle. Furthermore, it is possible to arrange the sensing region of the laser sensor in the direction of the tangential line of the operation line at all times, while keeping at least one of the work angle and the push angle at a predetermined value, even if the operating line is curved.

When all the above-described three kinds of control are not carried out simultaneously, the attitude of the robot may be determined by instructing proper restriction requirements, although there may leave the degree of freedom in the process of calculating a preferable attitude of the robot at the interpolation points.

Figure 2A:
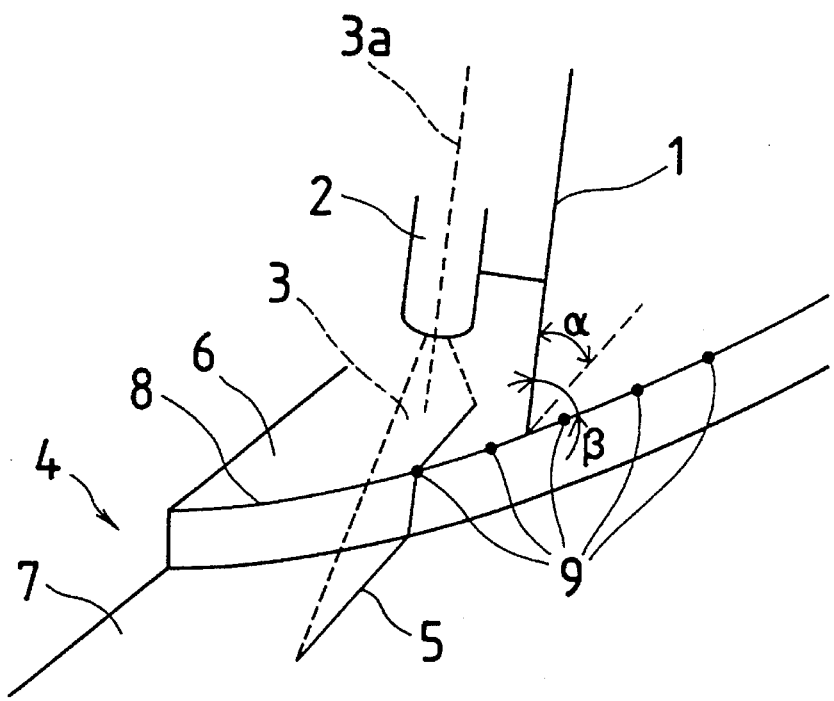
FIGS. 2A and 2B are schematic diagrams for illustrating how to define a push angle β and a tool-around angle γ by taking a welding operation for a step portion as an example.
Figure 2B:
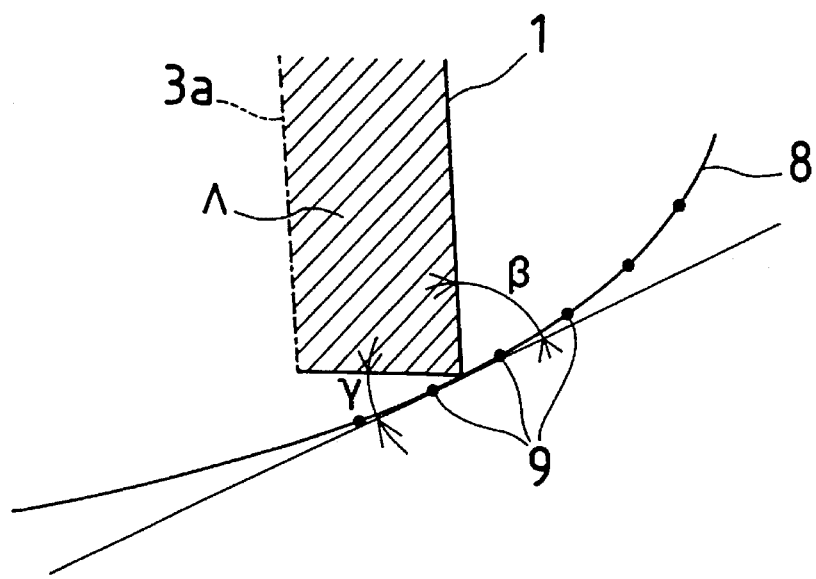
Figure 3:
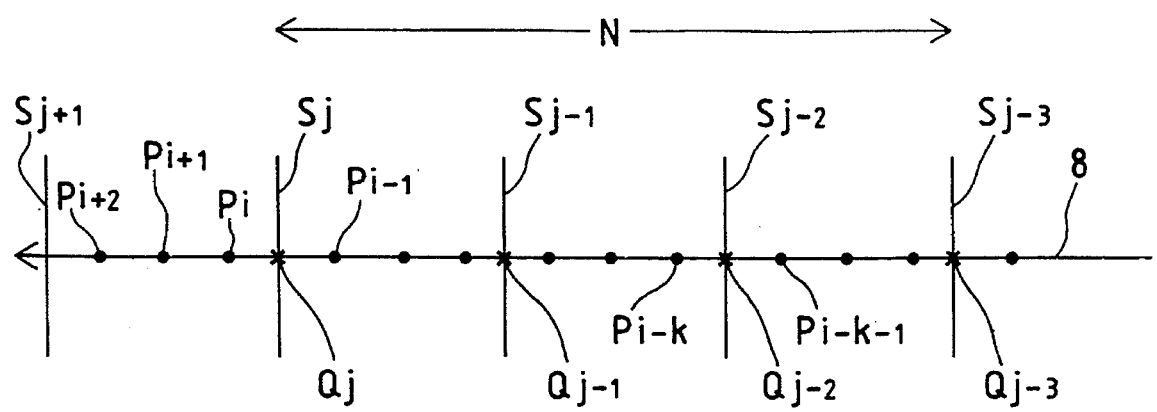
FIG. 3 is schematic diagram showing the relationship between the calculation period for the working angle α, the push angle β, and the tool angle γ (that is, sensing period of a laser sensor) and the interpolation points to be successive target points of the movement of a robot.
Figure 4:
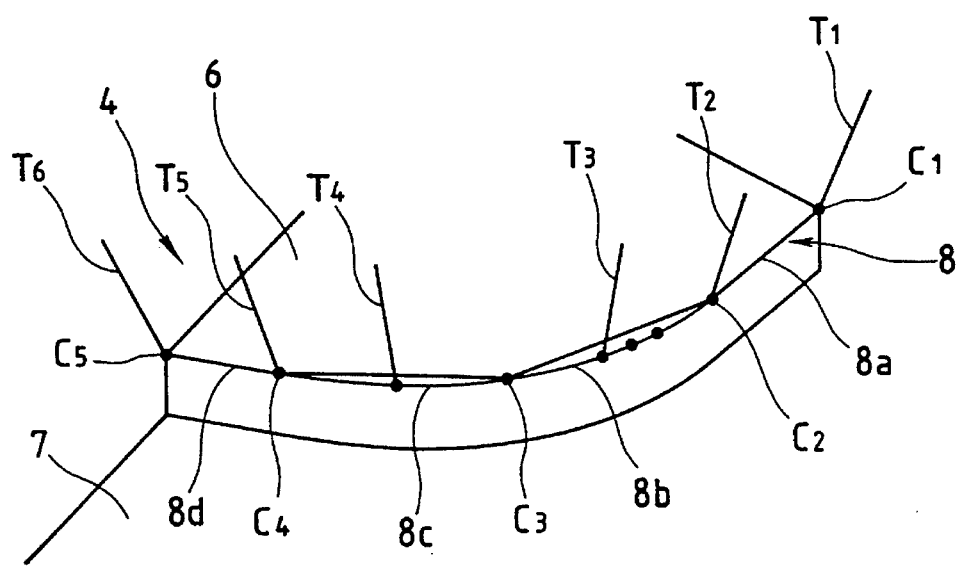
FIG. 4 is a schematic diagram showing the relationship between the operation line (welding line) and the tool axial line throughout the operation line, when the present method of controlling a robot is applied to the welding operation of the stage portion shown by FIGS. 2A and 2B by using a robot furnishing with a welding torch and a laser sensor.

FIG. 4 schematically shows a relationship between the operating line (welding line) and the tool axial line in view of the overall operating lines, where the welding operation is applied to the step portion shown in FIGS. 2A and 2B by using the robot provided with a welding torch and a laser sensor, according to the robot controlling method of the invention. In FIG. 4, the same reference numerals as those in FIGS. 1 to 3 are used to denotes the like components.

In FIG. 4, reference numeral 8 denotes a welding line drawn along the step part which is defined by two surfaces 6 and 7 of the workpiece 4. This welding line has straight lines 8a and 8d and gently curved lines 8b and 8c. The points $C_1$ to $C_5$ denotes instruction points. A polygonal line is shaped by connecting the instruction points $C_1$ to $C_5$ which have been instructed to the robot. Characters $T_1$ to $T_6$ show the attitudes of the tool 1 on the moving route of the robot along the operating line 8.

In this embodiment, whenever the robot (i.e., tool end point) is located at any point of these points, the robot is controlled so that the work angle $\alpha$, push angle $\beta$ and tool-around angle $\gamma$ may be identical with the set values i.e. $\alpha_{set}$, $\beta_{set}$ and $\gamma_{set}$.

Figure 5:
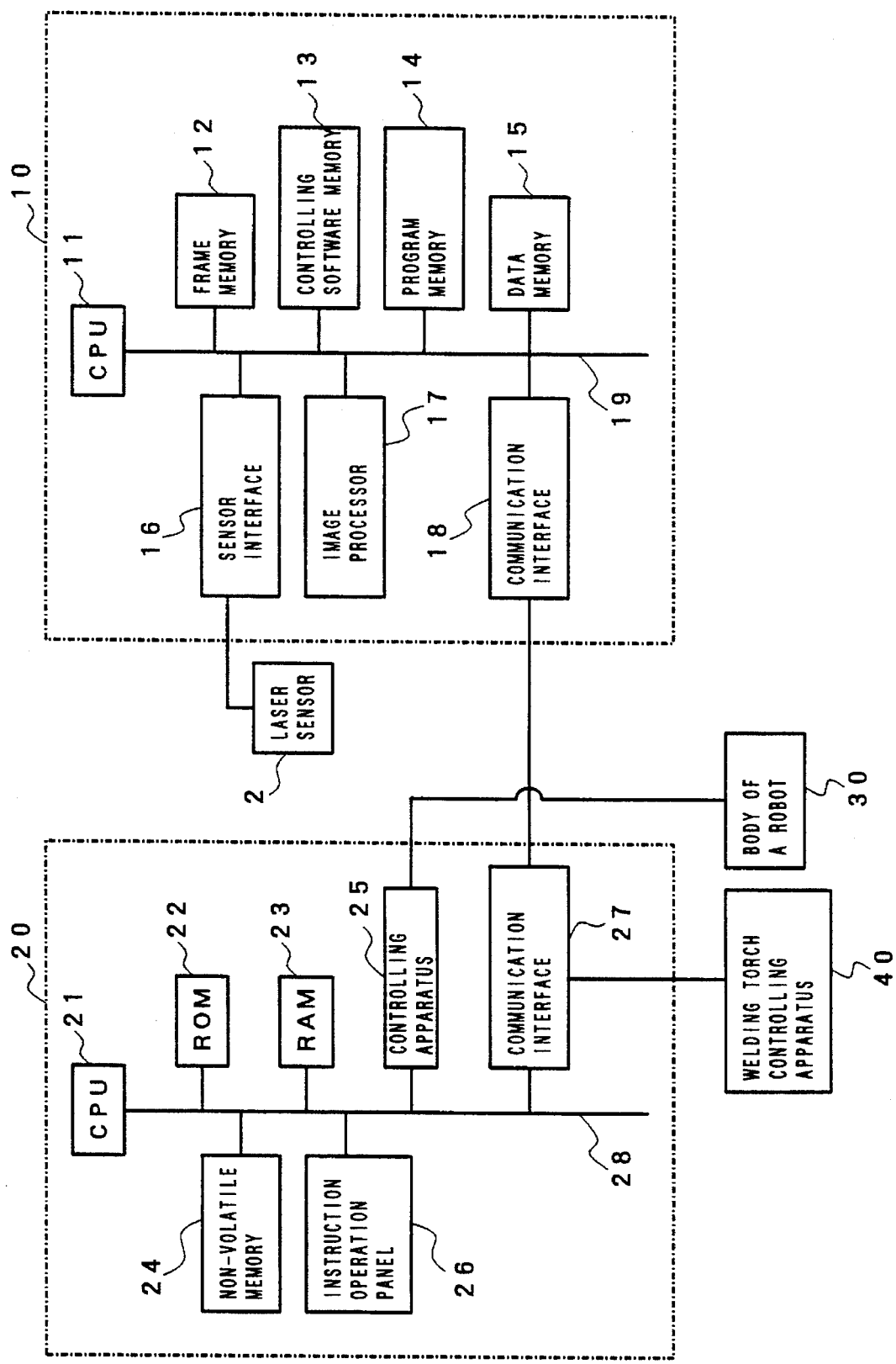
FIG. 5 is a block diagram showing a component of a robot/laser sensor system to be used in an embodiment of the present invention.

FIG. 5 is a block diagram showing main compositions of the welding robot/laser sensor system which is applicable to this embodiment of the invention.

The overall system is composed of a sensor controlling device 10, a robot controlling device 20, a body of a robot 30, a laser sensor 2, and a welding torch controlling apparatus 40 which controls the movement of the welding torch. The sensor controlling device 10 has a central processing unit (CPU) 11. The CPU 11 includes a frame memory 12, a memory for a controlling software 13 constructed by an ROM, a program memory 14 constructed by an RAM, a data memory 15 constructed by a non-volatile RAM, a sensor interface 16, an image processor 17, a communication interface 18, and a bus 19, wherein all components are connected with each other via the bus 19.

The laser sensor 2 is connected to the sensor interface 16. The operations of sensing and receiving image signals of the laser sensor 2 are carried out periodically according to commands from the CPU 11. The communication interface 18 is connected to a communication interface 27 of the robot controlling device 20. Serial communication of sensor data, and so on are mutually practiced through both the communication interfaces 18 and 27, according to an exclusive protocol.

The image obtained by a visual field of the CCD array of the laser sensor 2 is stored in the frame memory 12. The image processor 17 has a function for processing the image stored in the frame memory 12 according to the commands from the CPU 11. The controlling software memory 13 can store many programs, for example, a controlling program which is necessary for the CPU 11 to control the laser sensor 2, a program for calibration which is necessary to set the sensor coordinate by using a certain apparatus, a program which is necessary to transmit many sorts of data to the robot side at a proper timing, and other programs.

Incidentally, a TV monitor (not shown) can be connected to the sensor controlling device via a monitor interface in order to see and recognize the images that are obtained by the CCD array or are outputted from the frame memory 12.

On the other hand, the robot controlling device 20 has a central processing unit (CPU) 21. The CPU 21 is connected via a bus 28 to an ROM 22 for storing the controlling program, an RAM 23 for storing calculation data for a while, a memory 24 composed of a non-volatile RAM where instruction data or many kinds of set values are stored, an axial controlling apparatus 25 for controlling each axis of a body 1 of the robot (including a servo-circuit), an instruction operation panel 26 for practicing manual operations of the robot, setting of coordinates, instruction of positions, automatic driving (regenerative operation), and a communication interface 18 connecting to the communication interface 18 of the sensor controlling device 10. All components of the robot controlling device are connected with each other via a bus 28.

The communication interface 27 is connected to the welding torch controlling apparatus 40, while it is connected to the communication interface 18 of the sensor controlling device 10. The operations (ON/OFF operation, welding voltage/welding current value, and so on) of the welding torch controlling apparatus 20 are controlled according to commands from the CPU.

The components of the above-explained system and their functions are basically the same as a conventional welding robot system having a laser sensor which can practice a welding operation by the real time tracking method. However, the programs, which are necessary to carry out the processes described in FIG. 6 as a flow chart, are stored in the non-volatile memory 24 of the robot controlling device 20 in order to reduce this invention to practice. Procedures and processes for controlling the attitude of a robot will be explained by referring to the flow chart of FIG. 6. These procedures and processes are carried out in parallel with tracking a welding line. It is assumed that the sensor coordinate, the tool coordinate, and the workpiece coordinate have already been set and calibrated. Furthermore, the instruction path from $C_1$ to $C_5$ is instructed, set values, i. e. $\alpha_{set}$ of the work angle $\alpha$, $\beta_{set}$ of the push angle $\beta$ and $\gamma_{set}$ of the tool-around angle $\gamma$ are inputted, respectively, and further, a retroactive period number N is inputted. (see FIG. 3). The attitude of a robot at the construction point $C_1$ is given in conformity with the above set values.

Figure 6:
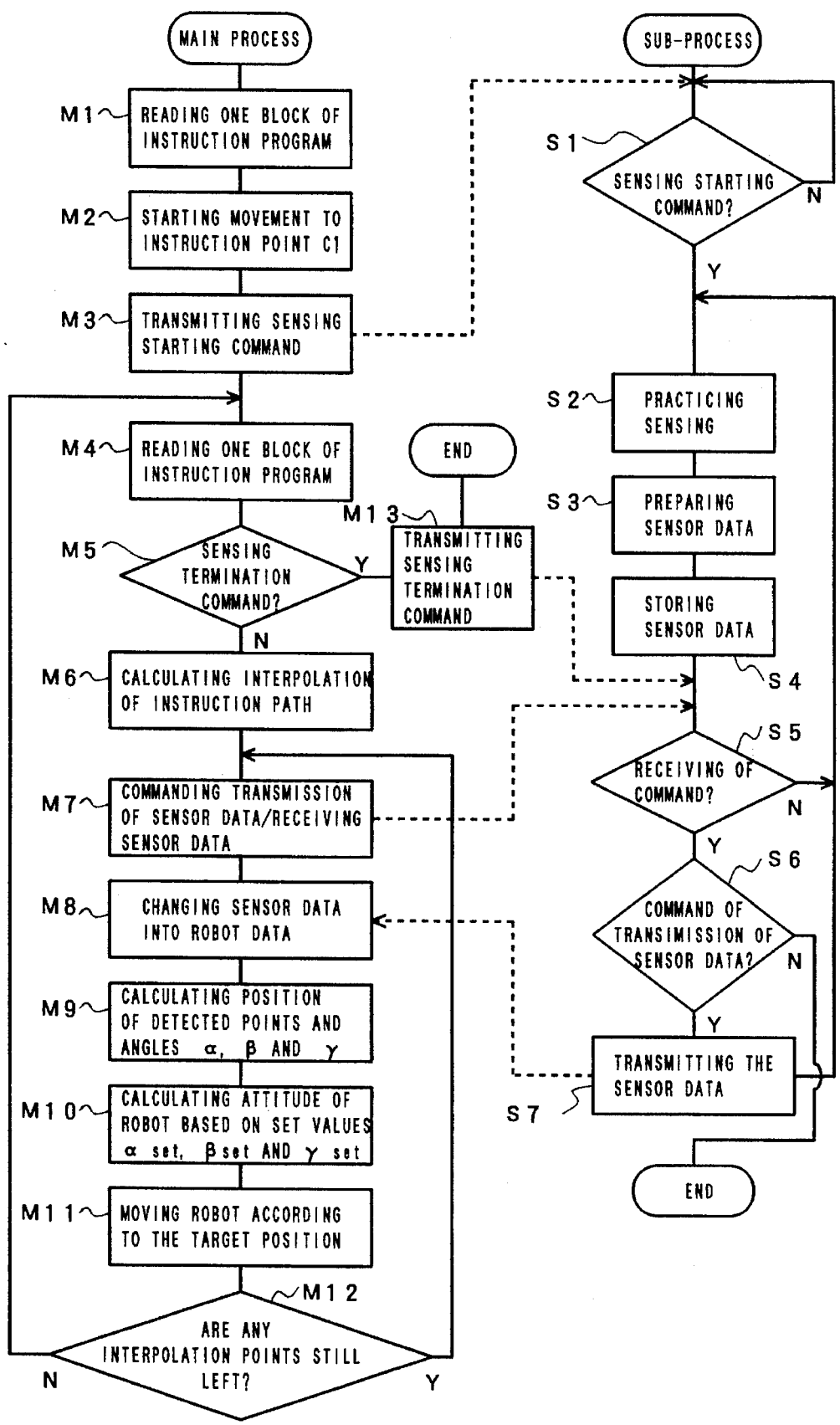
FIG. 6 is a flow chart showing processes of controlling attitudes of a robot in accordance with the present invention, performed together with tracking of the welding line shown in FIG. 4.

Processes for controlling the position and attitude of a robot are started under the above preparations, according to the flow chart of FIG. 6. The processes are divided into a main-process and a sub-process. The main-process is carried out by the robot controlling device 20, and the sub-process is carried out by the sensor controlling device 10. Both the main-process and the sub-process are practiced at the same time. Here, the body 1 of the robot stands by at an initial position near the point $P_1$.

First of all, the main- and sub-processes are simultaneously started by operating the teaching operation panel 26 of the robot controlling device 20. In the main-process, one block of a program is read out, wherein this block includes the position data of the instruction point $C_1$ which is indicated by the position instruction (shown as Step $M_1$ in FIG. 6). The robot begins to move from the initial position to the instruction point $C_1$ (shown as Step $M_2$ in FIG. 6). Further, the sensing beginning command by the laser sensor 3 is transmitted to the sensor controlling device 10 via the communication interfaces 27 and 18, as soon as the sensing region of the laser sensor 3 begins to overlap with the welding line 8 (shown as Step $M_3$ in FIG. 6).

The sensor controlling device 10 finishes the start-up and the deflection of laser beams and the image preparation of the CCD array with the beginning of the sub-process, and enters the condition of waiting for the transmission of the sensing starting command (shown as Step $S_1$ in FIG. 6). As soon as the sensing starting command is received from the Step $M_3$ of the main-process, the sensing by the laser sensor 3 begins (execution of the first sensing; Step S2). Moreover, the CPU 11 makes the sensor data of the crossing points ($Q_k$; k=1, 2, . . . j–1, j, . . . in FIG. 3) of the beam across the welding line 8 and the irradiation point locus 5 (see FIGS. 1A to 2B) by taking in the image of the locus of the laser beam scanning in the sensing region and by processing the locus by a software utilizing the image processor 17. The above procedure is shown as Step $S_3$ in FIG. 6. The sensor data are stored in the data memory 15 (shown as Step $S_4$ in FIG. 6). Further, the data memory 15 has an extra region enabling the memory 15 to write sets of the sensor data in circulation.

Sensing by the laser sensor 3 and storing the sensor data following the sensing are periodically repeated until the sensing termination command is transmitted from the robot controlling device 20 (see Step $M_{13}$ of the main process). More specifically, the CPU 11 confirms whether or not the command from the robot controlling device 20 is received in Step $S_5$. If the command of transmitting the sensor data is received, sensor data of necessary sensing periods are transferred (Step $S_6$–Step $S_7$). After that, the procedure returns to Step $S_2$, and the next sensing :processes, i.e., Step $S_2$ to Step $S_5$ are executed again in order. If there is no receiving of the command from the robot controlling device 20 in Step $S_5$, the procedure directly returns to Step $S_2$.

In the main-process, the CPU 21 reads one block of the instruction program including the position data of the instruction point $C_2$ in Step $M_4$ following Step $M_3$. After that, the CPU 21 confirms whether the data read from Step $M_4$ are not based on the command of terminating the procedure in Step $M_5$. The CPU 21 begins to calculate the interpolation of the instruction path between the instruction points $C_1$ and $C_2$ in Step $M_6$. Next, the command for transferring sensor data, regarding the detected points and the irradiation point locus 5 of the necessary periods, is transmitted to the sensor controlling device 10 via the communication interfaces 27 and 18 so as to correct the position (tracking) and to control the attitude of the robot. In Step $M_7$, necessary sensor data are received in the robot controlling device 20. The processes which are corresponding to Step $M_7$, are carried out in Step $S_5$ to Step $S_7$ of the sub-process in the sensor controlling device 10.

The CPU 21 of the robot controlling device 20 changes the received sensor data into robot data in Step $M_8$. The CPU 21 calculates the current positions of the detected points, the current work angle $\alpha$, current push angle $\beta$, and current tool-around angle $\gamma$ in Step $M_9$.

Furthermore, the attitude of the robot satisfying the following equations, i.e. $\alpha=\alpha_{set}$, $\beta=\beta_{set}$ and $\gamma=\gamma_{set}$ in the interpolation point, is calculated under the initial condition of the above calculated values and the retroactive data of the detected points (N numbers of preceding detected point data) in Step $M_{10}$. If there are not sufficient retroactive data of N numbers, however, other data, such as instruction data, can be used to compliment the deficiency of the retroactive data.

Next, the movement of the robot is practiced to the interpolation point with the calculated position and the calculated attitude as a target position in Step $M_{11}$.

In the following step, the CPU 11 confirms whether interpolation points remain or not. Hence, it is recognized whether the robot has reached the next instruction point or not. If some interpolation points are still left, the procedure returns to Step $M_7$. The newest sensor data are transmitted from the sensor controlling device 10, and the processes of from $M_8$ to $M_{12}$ are repeated once more in the same manner as in the previous case. If new sensor data have not been stored in the data memory 15, the signal controlling device notices the robot controlling device of the non existence of new data. When Step $M_{12}$ judges "No" i. e. no interpolation points remain, the procedure returns to Step $M_4$, and the next block of the instruction program is read from the RAM 24. The following processes of Step $M_5$ to Step $M_{12}$ are similar to the last case.

At Step $M_4$ just before the robot reaches the last instruction point $C_5$, the CPU 21 reads in one block including a process termination command from the instruction program. The judgement of "Yes" is issued in Step $M_5$. The sensing termination command is transmitted from the robot controlling device 20 to the sensor controlling device 10 in Step $M_{13}$, and the main process is finished. Receiving the sensing termination command, the CPU 11 makes an end of the sensing operation (turning off the laser sensor 2), and all the processes are finished without advancing toward the following processes, i. e. Step $M_5$, Step $M_6$, and Step$_7$.

The embodiment of this invention has been explained hitherto. This embodiment is applied to the example shown in FIG. 4. It is apparent that the technical idea of this invention is applicable to any other cases. Many sorts of versions are applicable to the compositions of the systems which actually put this invention into practice. For example, it is feasible to take another structure in which the laser sensor, the image processor, the frame memory and so on are built in the robot controlling device and are connected to the CPU 21 by a bus-coupling via the sensor interface, instead of the structure shown in FIG. 5.

Further, it is possible to omit one or two angles of the three angles, $\alpha$, $\beta$ and $\gamma$ in accordance with applications or shapes of the workpiece. In this case, as mentioned in the column for explaining functions of this invention, other restrictions can be given to determine the attitude of a robot, for example, an inclination angle of an axis of the robot to the base coordinate.

Further, it is possible to give different values to the set values, i. e. $\alpha_{set}$, $\beta_{set}$ and $\gamma_{set}$ in every interval between instruction points.

As explained hitherto, the present invention enables a robot to control the attitude by signifying three angles, i.e. work angle $\alpha$, push angle $\beta$, and tool-around angle $\gamma$, in addition to the conventional method of controlling only the position of a robot by using a laser sensor.

Therefore, the performance of laser sensor/robot system can be widely heighten by applying the method of the present invention to many kinds of applications.

What is claimed is:

1. A method of controlling a robot attached to a tool, comprising the steps of:

emitting a laser light;

periodically scanning a surface of a workpiece with said laser light toward a direction across an operating line of said workpiece;

forming a locus of laser irradiations points on a surface of said workpiece based on said scanning;

periodically calculating a work angle between an axis of said tool and said locus of laser irradiations points;

determining a target robot attitude based on said work angle equaling a predetermined angle value; and controlling a movement of said robot along said operating line of said workpiece at said target robot attitude.

2. A method of controlling a robot attached to a tool according to claim 1, further comprising the steps of forming a plurality of crossing points on said operating line of said workpiece based on said scanning and periodically calculating a push angle between said axis of said tool and said operating line passing through said plurality of crossing points, and wherein said determining step includes the step of determining said target robot attitude based on said work angle equaling said predetermined angle value and said push angle equaling a second predetermined angle value.

3. A method of controlling a robot attached to a tool according to claim 1, further comprising the step of periodically calculating a tool-around angle as a rotational angle around said axis of said tool with respect to said operating line, and wherein said determining step includes the step of determining said target robot attitude based on said work angle equaling said predetermined angle value and said tool-around angle equaling a second predetermined angle value.

4. A method of controlling a robot attached to a tool according to claim 1, further comprising the steps of forming a plurality of crossing points on said operating line of said workpiece based on said scanning, periodically calculating a push angle between said axis of said tool and said operating line passing through said plurality of crossing points, and periodically calculating a tool-around angle as a rotational angle around said axis of said tool with respect to said operating line, and wherein said determining step includes the step of determining said target robot attitude based on said work angle equaling said predetermined angle value, said push angle equaling a second predetermined angle value and said tool-around angle equaling a third predetermined angle value.

5. A method of controlling a robot attached to a tool, comprising the steps of:

emitting a laser light;

periodically scanning a surface of a workpiece with said laser light toward a direction across an operating line of said workpiece;

forming a plurality of crossing points on said operating line of said workpiece based on said scanning;

periodically calculating a push angle between an axis of said tool and said operating line passing through said plurality of crossing points;

determining a target robot attitude based on said push angle equaling a predetermined angle value; and controlling a movement of said robot along said operating line of said workpiece at said target robot attitude.

6. A method of controlling a robot attached to a tool according to claim 5, further comprising the step of periodically calculating a tool-around angle as a rotational angle around said axis of said tool with respect to said operating line, and wherein said determining step includes the step of determining said target robot attitude based on said push angle equaling said predetermined angle value and said tool-around angle equaling a second predetermined angle value.

7. A method of controlling a robot attached to a tool, comprising the steps of:

emitting a laser light;

periodically scanning a surface of a workpiece with said laser light toward a direction across an operating line of said workpiece;

periodically calculating a tool-around angle as a rotational angle around an axis of said tool with respect to said operating line;

determining a target robot attitude based on said tool-around angle equaling a predetermined angle value; and controlling a movement of said robot along said operating line of said workpiece at said target robot attitude.

* * * * *